United States Patent
Popil (10) Patent No.: US 7,221,504 B2
(45) Date of Patent: May 22, 2007

(54) IN-GROUND TELESCOPE WITH A STATIONARY PRIMARY OBJECTIVE MIRROR HAVING MOVABLE COLLECTORS

(76) Inventor: Nicholas B. Popil, King James North, 800 Brick Mill Run, Apt. #301, Westlake, OH (US) 44145

( * ) Notice: Subject to any disclaimer, the term of this patent is extended or adjusted under 35 U.S.C. 154(b) by 84 days.

(21) Appl. No.: 11/114,863

(22) Filed: Apr. 25, 2005

(65) Prior Publication Data
US 2006/0238859 A1    Oct. 26, 2006

(51) Int. Cl.
G02B 23/00    (2006.01)
(52) U.S. Cl. .................................... 359/399
(58) Field of Classification Search ............. 359/364, 359/365, 366, 399, 429, 430, 727–731, 846, 359/849, 851, 853, 858, 859
See application file for complete search history.

(56) References Cited

U.S. PATENT DOCUMENTS

| | | |
|---|---|---|
| 4,484,798 A | 11/1984 | Howden |
| 4,776,684 A | 10/1988 | Schmidt-Kaler |
| 5,291,333 A | 3/1994 | Mills |
| 5,347,401 A | 9/1994 | Hiigenell |
| 5,640,283 A | 6/1997 | Warren |
| 5,661,610 A | 8/1997 | Pasternak |
| 5,831,762 A | 11/1998 | Baker et al. |
| 6,571,069 B2* | 5/2003 | Ishikawa et al. ............ 396/432 |
| 2002/0171924 A1* | 11/2002 | Varner et al. ............... 359/363 |

OTHER PUBLICATIONS

Revolution in Telescope Design, by Lynn Yarris, from Sciencebeat, Winter, 1992.
Development of the Segment Alignment Maintenance System (SAMS) for the Hobby-Eberly Telescope, by John A. Booth, et al, Proceedings SPIE—2000.
Development of a Star Tracker for the Hobby-Eberly Telescope, from SPIE, vol. 3351—0277-786X/98, Copy attached.

* cited by examiner

Primary Examiner—Alessandro Amari
(74) Attorney, Agent, or Firm—Joseph H. Taddeo (57) ABSTRACT

The present invention relates to a novel land based reflecting telescope having a stationary, equatorially mounted, segmented mirror comprised of a plurality of movable mirrored collectors. These movable collectors are arranged in hexagonal groups to form a multiple mirrored reflector, which comprises the stationary compound telescope. A secondary mirror mounted atop a tower at the focal point directs the image toward the observation cart. Observers ride the periphery of the stationary mirror at a rate of one revolution per day. A retractable air supported hypalon cover protects the large primary mirror structure.

16 Claims, 9 Drawing Sheets

| Magnifying Power | Light Gathering | PSEE comparison 100-inch | PSEE comparison 200-inch | PSEE LIGHT GATHERING POWER AND RESOLUTION GOALS |
|---|---|---|---|---|
| 100-inch existing telescope | 54.6 sq. ft. | 1 | | |
| 200-inch existing telescope | 218.4 sq. ft. | 4 | 1 | 10,000 Power |
| 100-foot PSEE telescope | 7065 sq. ft. | 129.4 | 32.3 | 40,000 Power |
| 200-foot PSEE telescope | 28260 sq. ft. | 517.6 | 129.5 | 1,293,956 Power |
| 300-foot PSEE telescope | 63585 sq. ft. | 1164.7 | 297.1 | 5,175,824 Power |
| 500-foot PSEE telescope | 176625 sq. ft. | 3234.9 | 808.7 | 7,763,736 Power |
|  |  |  |  | 32,348,900 Power |

PERFORMANCE COMPARISON BASED ON LIGHT GATHERING

FIG. 7

IN-GROUND TELESCOPE WITH A STATIONARY PRIMARY OBJECTIVE MIRROR HAVING MOVABLE COLLECTORS

CLAIM FOR BENEFIT OF PREVIOUS APPLICATIONS

Applicant claims the benefit of application Ser. No. 10/304,073, filed Nov. 26, 2002, issued on Apr. 26, 2005, U.S. Pat. No. 6,885,501.

FIELD OF INVENTION

The present invention relates primarily to optical telescopes, and more particularly to a compound telescope including a stationary primary mirror having movable collectors.

BACKGROUND OF THE INVENTION

In 1608, a Dutch optician named Hans Lippershey was the first to invent the telescope. The great Italian scientist Galileo Galilei, who became the first man to see the craters of the moon, and who went on to discover sunspots, the four large moons of Jupiter, and the rings of Saturn, introduced it to astronomy in 1609. Galileo's telescope was similar to a pair of opera glasses because it used an arrangement of glass lenses to magnify objects. This arrangement provided limited magnification, of about 30 times for Galileo, as well as a narrow field of view. Galileo was able to see only a fraction of the moon's face without the need for repositioning his telescope.

It was in 1704 that Newton announced a new concept in telescope design whereby a curved mirror, instead of glass lenses, was used to gather in light and reflect it back to a point of focus. This reflecting mirror acts like a light-collecting container: the bigger the container, the more light it can collect. Newton's novel reflector telescope design opened the door for magnifying distant objects thousands of times, far beyond what could ever be obtained with a lens.

There were many modifications to the method of focusing over the next two centuries, but Newton's fundamental principle of using a single curved mirror to gather in light remained unchanged.

In the mid-1920s, the results obtained from the Mount Wilson Observatory's 100-inch telescope demonstrated the need for a larger instrument if further advances in astronomical research were to be realized. It was the vision of astronomer George Ellery Hale to construct a 200-inch telescope. It was in 1934 that Palomar Mountain was selected as the site for the new instrument.

Thus, the Hale telescope, a telescope with a monolithic reflecting mirror, was soon to become a reality. Using Hale's approach presented a number of technical problems. A reflecting mirror, 200-inch (5 meters) in diameter would require an elaborately complex structural support system to keep it from collapsing under its own enormous weight. In addition, the larger a mirror's surface, the thicker it must be in order to withstand gravitational effects that could alter its shape. And, as the size is increased, so does the cost of the mirror, until it becomes exorbitant.

The telescope structure, whose construction began in 1928, was nearly completed by 1941 when the United States entered World War II. But the war delayed polishing of the mirror, and it was not until Nov. 20, 1947, that the finished mirror was finally installed in the telescope on Palomar Mountain.

The major change that took place was the growth in the size of the reflecting mirror, from the 6-inch mirror used by Newton to the 6-meter (236 inches in diameter) mirror of the Special Astrophysical Observatory in Russia, which opened in 1974.

The main reason astronomers build larger telescopes is to increase light-gathering power so that they can see deeper into the universe. Unfortunately, the cost of constructing larger single-mirror telescopes increases rapidly, approximately with the cube of the diameter of the aperture. Thus, in order to achieve the goal of increasing light-gathering power while keeping costs down, it has become necessary to explore new, more economical and nontraditional telescope designs. The American-built Multiple Mirror Telescope (MMT), located at the Whipple Observatory in Arizona, represents such an effort.

Since 1979, completely new and radical designs for astronomical telescopes have emerged. The Multiple Mirror Telescope (MMT), at Whipple Observatory, was the prototype, both technically and institutionally, for the next generation of large telescopes. The MMT was the world's first large-scale multiple mirror telescope, which used the combined light of six 72-inch reflecting paraboloid mirrors mounted in a single framework; where the light from all the mirrors is concentrated into a single focus. The mirrors, being under computer control, are automatically aligned at regular intervals.

The concept for using an ensemble of segmented mirrors dates back to the 19th century, but experiments with it had been few and small, and many astronomers doubted its viability. It remained for the Keck Telescope to push the technology forward and bring into reality this innovative design.

The Keck telescope is a 400-inch (10-meter) multi-mirror telescope that is comprised of 36 contiguous, adjustable mirror segments, all under computer control. It is now the largest reflector in the world and is used for both optical and infrared observations. The Keck telescope is situated on Mauna Kea on the island of Hawaii, which is the site of many major telescopes because its viewing conditions are the finest of any Earth-based observatory. This site lies at an elevation almost twice that of any other major observatory. Because it is above 40 percent of the Earth's atmosphere, there is less intervening atmosphere to obscure the light from distant stellar objects.

Even larger multimirror instruments are currently being planned by American and European astronomers.

The following prior art discloses the various aspects in the design of the large telescopes in use today.

U.S. Pat. No. 4,484,798, granted Nov. 27, 1984, to H. Howden, discloses a method of manufacturing a multiple mirror reflector for land-based telescopes. At least one series of identical segments are mounted on a rigid support to form a large primary reflector with each segment forming a part of the total profile. Each segment includes an accurately profiled reflective metal layer bonded to a concave surface of a substrate by an adhesive layer: The layer is formed on the appropriate substrate surface by transfer replication.

U.S. Pat. No. 4,776,684, granted Oct. 11, 1988, to T. Schmidt-Kaler, discloses a very large optical telescope for observing light phenomena in the wavelength region of about 0.3 to 30 or even to 300 Um. To realize a very large filled aperture it is proposed to arrange comparatively few individual reflectors around a central monolith, which can be individually adjusted optically to the central monolith which gives the reference wave front, by means of an adjustment device and/or bright starts. In this way manufacturing, polishing and transport of very large primary reflectors can be handled. Further deformations due to wind loads, temperature variations and other influences can be easily compensated. The primary reflector is carried by a yoke with the focus of the secondary mirror being in or near the elevation axis so that the usual mirror cell becomes superfluous, the beam moves only slowly with elevation and heavy instrumentation can be put directly near the focus.

Presently, the above prior art teaches of land based telescopes having large movable primary mirror structures.

What is needed is a large telescope that utilizes a stationary, segmented primary mirror. In this regard, the present invention fulfills this need.

It is therefore an object of the present invention to provide for a reflector telescope having a stationary, segmented primary mirror.

It is another object of the present invention to provide for a reflector telescope having a stationary, segmented primary mirror that is set in the equatorial position (for the Northern Hemisphere) to point at the North Star at the latitude position of its location.

It is still another object of the present invention to provide for a reflector telescope having a stationary, segmented primary mirror that is set in the equatorial position (for the Northern Hemisphere) to point at the North Star at the latitude position of its location, thereby keeping the latitude constant. The Southern Cross would serve as a reference in the southern hemisphere.

It is still yet another object of the present invention to provide for a reflector telescope having a means for traversing the primary mirror perimeter, such as a cart with eyepieces that travels on the perimeter of the stationary primary mirror at a rate of one revolution per day to follow the primary image.

These as well as other objects and advantages of the present invention will be better understood and appreciated upon reading the following detailed description of the preferred embodiment when taken in conjunction with the accompanying drawings.

SUMMARY OF THE INVENTION

The present invention relates to a novel land based reflecting telescope having a stationary, equatorially mounted, segmented mirror comprised of a plurality of movable mirrored collectors. These movable collectors are arranged in groups to form a multiple mirrored reflector, which comprises the stationary compound telescope. This novel segmented arrangement is so designated as the Popil Stationary Equatorial Expandable (PSEE) telescope system.

The longest and heaviest portion of the present invention is the objective lens, which is stationary. The eyepieces are movable to the most convenient place of the observers, around the periphery of the of the large stationary objectives lenses that transmits the image by smaller mirrors or prisms to the observer or to an electronic receiver. Also, this image can be picked up and transmitted to an interior screen or television. All of the auxiliary instruments, such as the spectroscope the radiometer, and photometry move around the periphery of the large stationary mirror with the eyepiece; Thereby rendering simultaneous normal observation concurrent with measurement performed by the auxiliary instruments or the transmitted image on the interior screen.

Eliminating the large cumbersome mechanical equipment required to move the thousands of tons of heavy expensive equipment can attain large cost savings. Instead, of "riding the tube" as is done at Mt. Palomar, the observers that ride the cart of the present invention, glide on tracks around the periphery surface of the large objective mirrors in movable comfortable carts with more stability and at far less cost. Alternatively, data emitted from the primary segmented mirror can be viewed on the interior screen described above. A cost savings of over 80% can result when a comparison is made to the existing state of the art telescopes.

Another large saving can be made by eliminating most of the cost of the high structural metal and masonry walls of a typical observatory. About 30 feet of wall height would be sufficient for isolating and housing the telescope of the present invention.

The costly rotatable structural metal dome roof with its retractable metal section would be replaced with a flexible hypalon material retractable roof that is air supported that would be more functional. Ancillary buildings can be added as needed.

BRIEF DESCRIPTION OF THE DRAWINGS

The present invention is pictorially illustrated in the accompanying drawings that are attached herein.

DETAILED DESCRIPTION OF THE INVENTION

Of all the tools and instruments of science, there is none so grand or enduring as the telescope. By observing the heavens, a telescope brings us images of the past that say much about the present and provide clues about the future.

Figure 1:
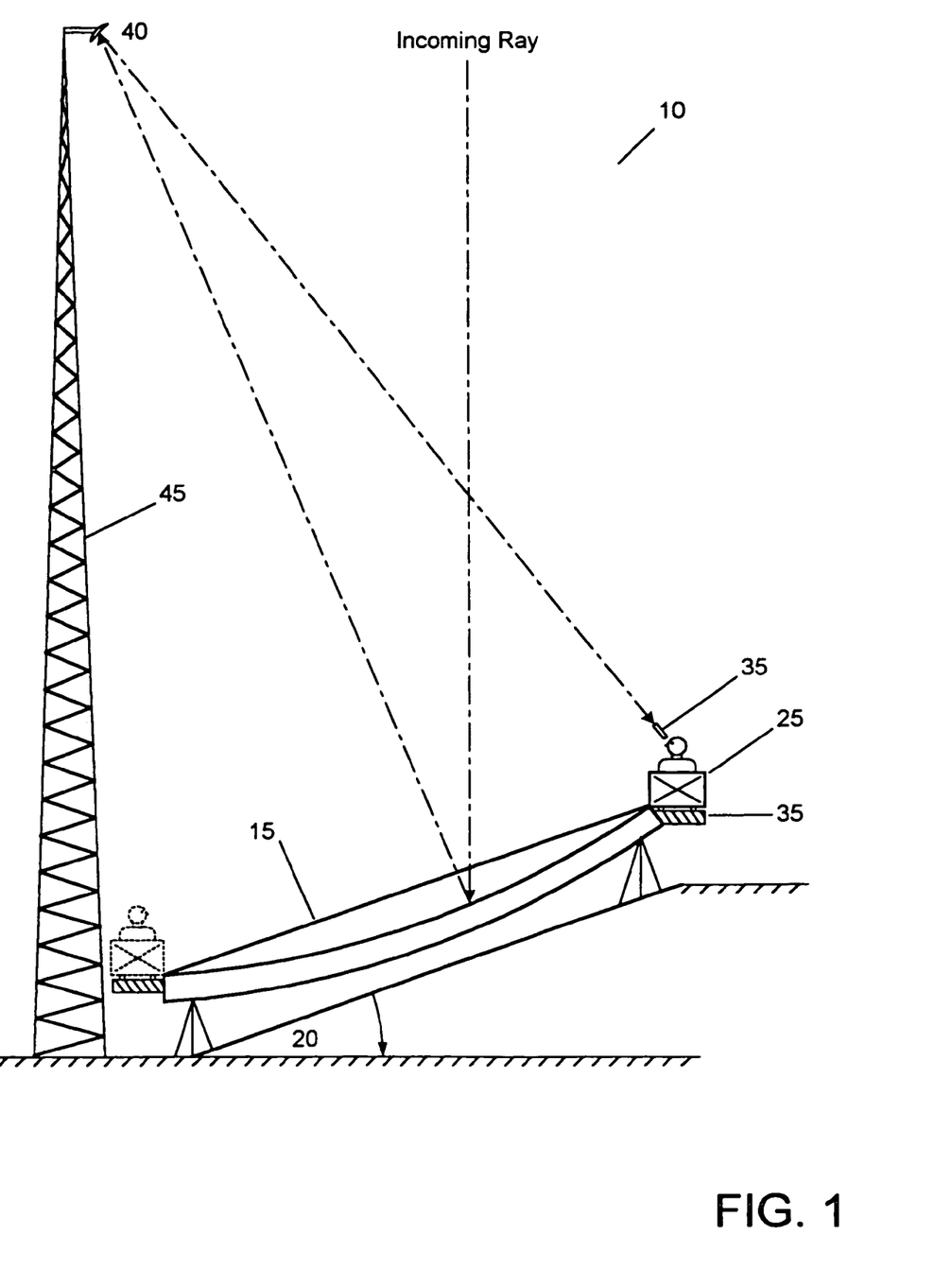
FIG. 1 is a schematic view of the PSEE macro telescope system according to the present invention.

In FIG. 1, there is shown the large stationary telescope system 10. The large primary mirror 15 is set in the equatorial position to point at the North Star (for the Northern Hemisphere) at the latitude position of its location. Because of the rotation of the earth on its axis, the latitude is now constant. The angle-of-tilt 20, conforms to the latitude at the telescope site. By installing the large multi-objective lens in the equatorial position, it is always in synchronous latitude for viewing from earth, as it has been doing for the past billion years. So we can merely pick up this view by picking up the longitude with the eyepiece. Heretofore, all conventional telescopes have been moving hundreds of tons of telescope, mechanical equipment and heavy glass objectives. This invention obviates the need for such heavy devices. Each mirror segment is includes a waffle rib formation to keep the glass thickness to 2 inches, so that the lenses can adapt more rapidly to temperature changes.

Determining the longitude is achieved by running the observation conveyance 25, which glides about the perimeter of the stationary primary mirror 15. The conveyance or cart 25 is preferably mounted on the circular track 30 around the perimeter of the stationary primary mirror 15. The cart traverses the perimeter at a rate of one revolution per day to follow the primary image.

The observer eyepieces 35 are mounted on cart 25 and are trained at the secondary mirror 40 that is mounted upon the top of tower 45; Or, the image can be projected to an interior screen.

All the auxiliary instruments (not shown), such as the spectroscope, radiometer, and thermocouple move on the cart around the periphery of the primary cart. Normal observations and auxiliary instruments may be used simultaneously or individually.

Figure 1A:
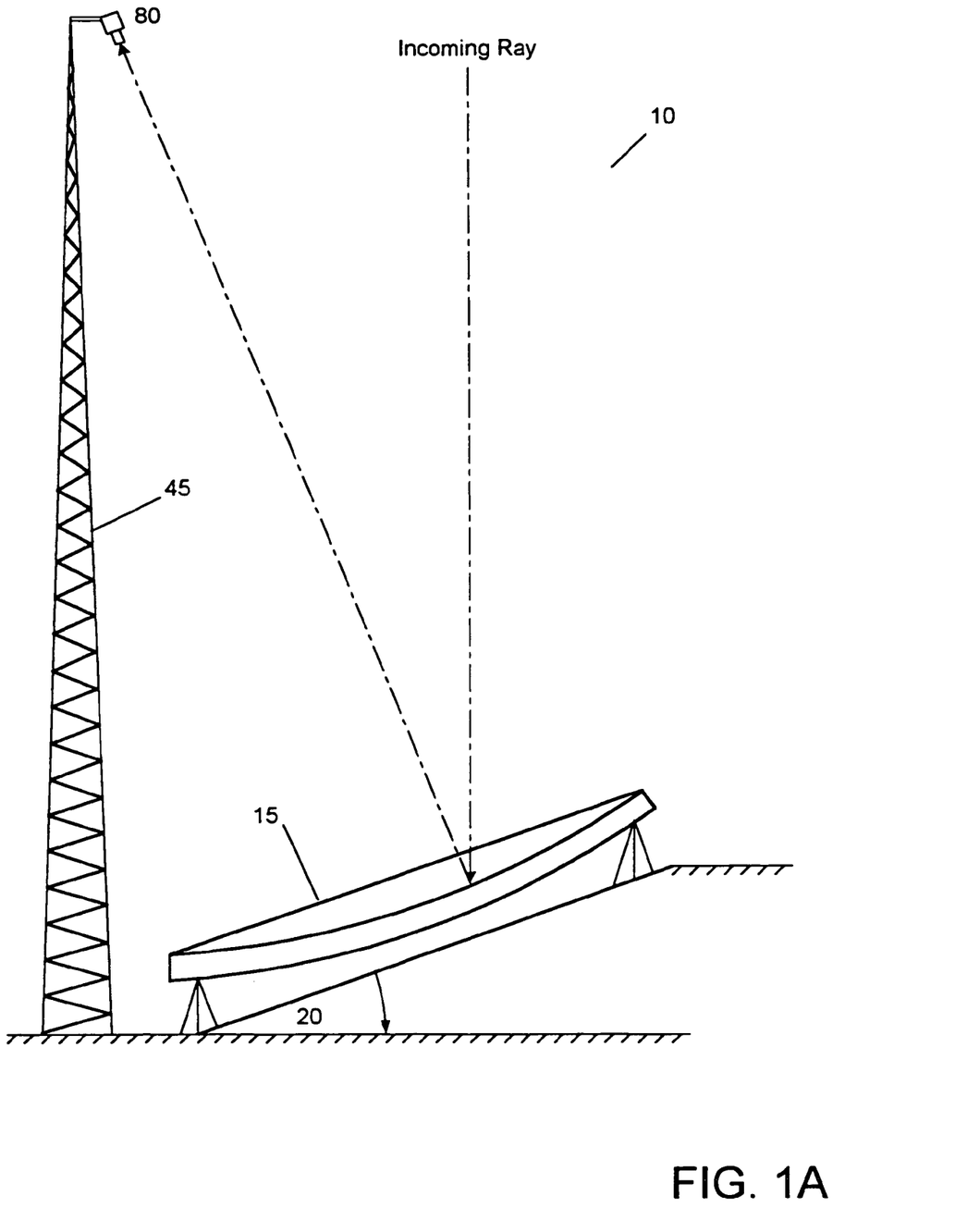
FIG. 1A is a schematic view of the PSEE macro telescope system according to the present invention, wherein a video camera is positioned at the focal point of the primary collecting mirror.
Figure 1B:
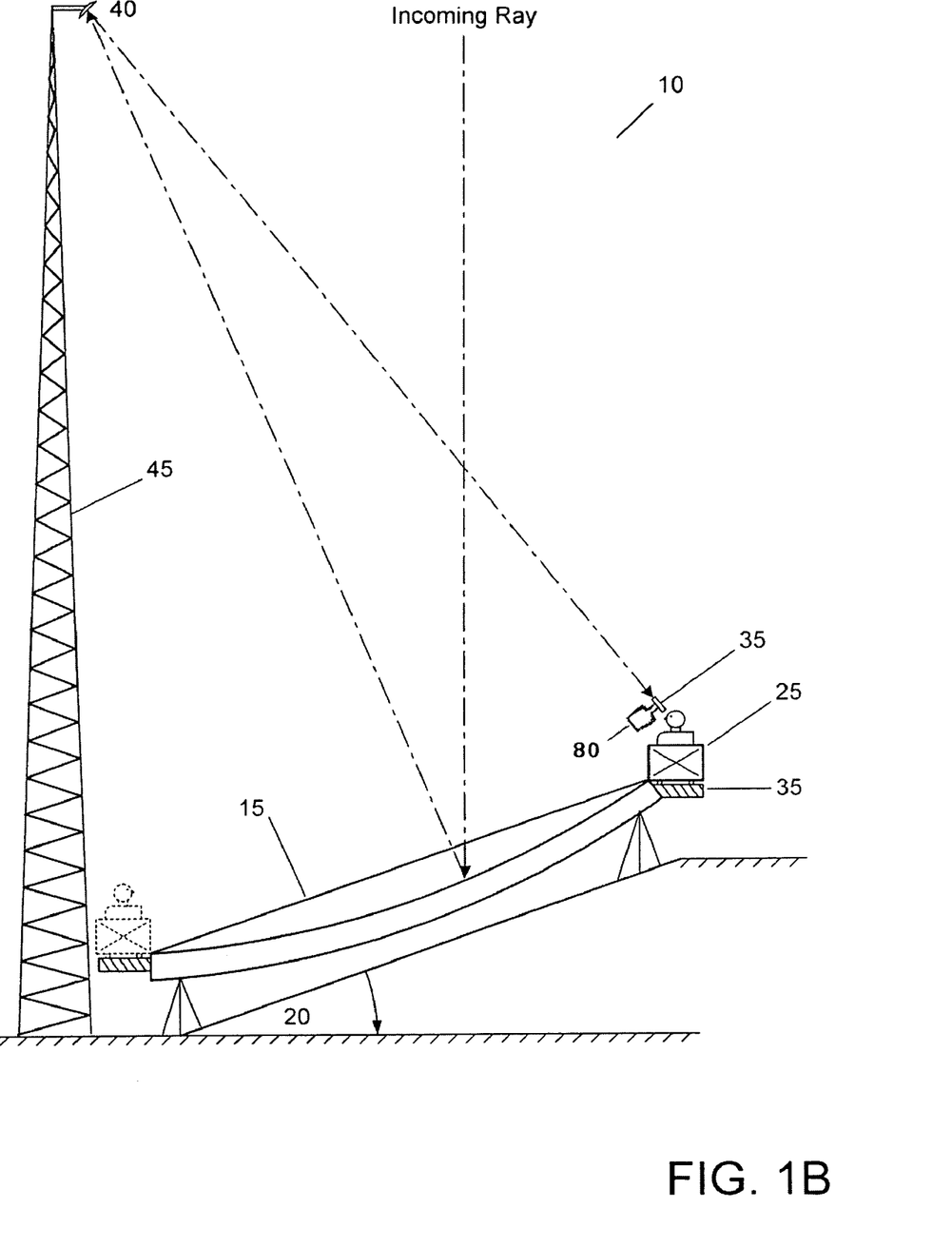
FIG. 1B is a schematic view of the PSEE telescope system according to the present invention, wherein a camera is associated with the observer eyepiece at the perimeter of the stationary primary mirror.

Referring now to FIG. 1A, a video camera 80 is positioned on the tower 45 to obtain data emitted from the primary collecting mirror 15 and to broadcast or otherwise promulgate that data to various receivers as required. Use of the camera 80 provides the capability for obtaining information concerning dim objects of deep space, which the human eye is cannot discern. As seen in FIG. 1B, camera 80 is associated with the observer eyepiece 35 that is positioned on the perimeter of the stationary primary mirror 15. The camera preferably includes digital capability or a videocam with internet access, for promulgating the images obtained on the internet in real time.

Figure 2:
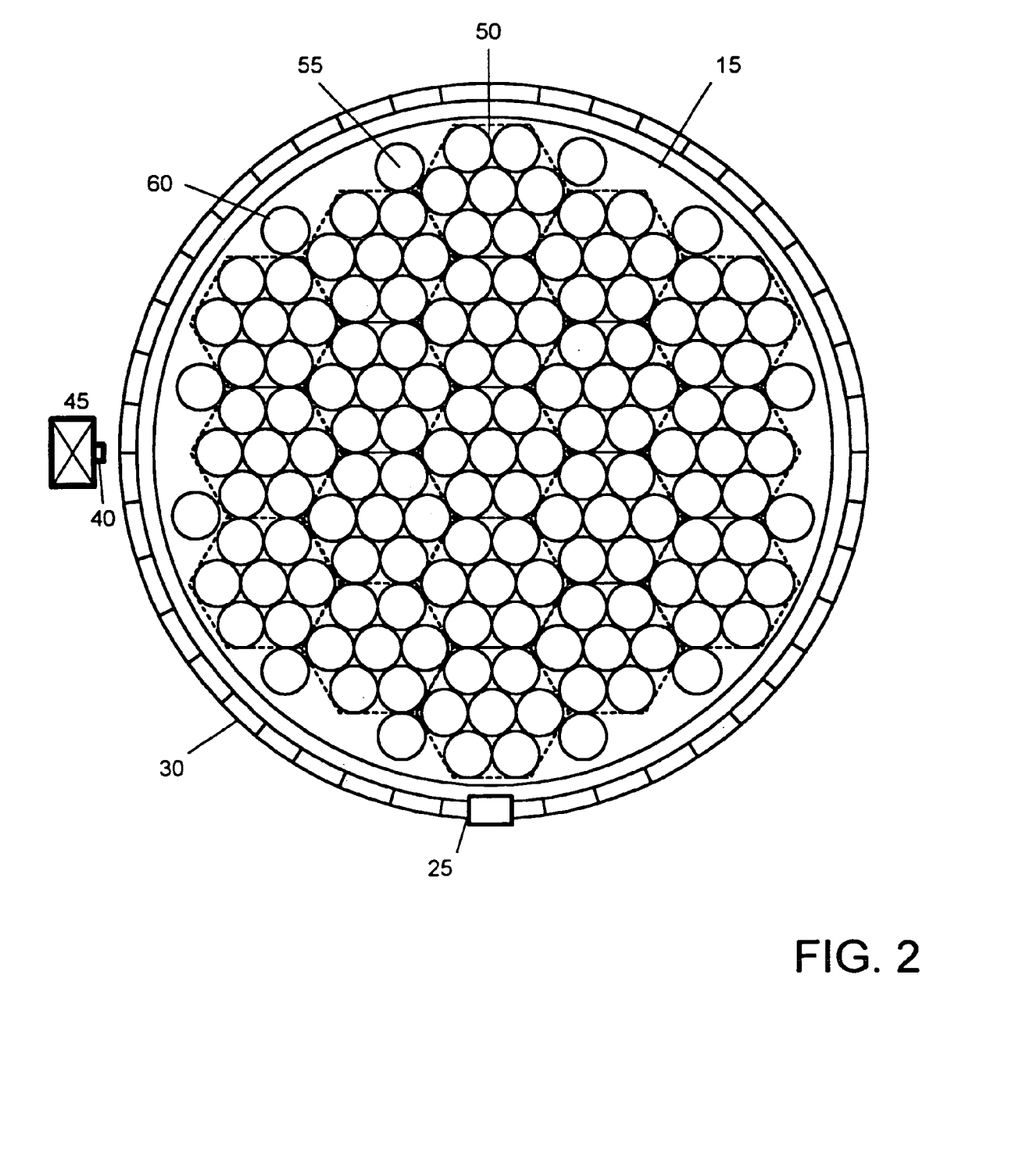
FIG. 2 is a plan view of the schematically shown, stationary, segmented multi-reflector, primary mirror of the present invention.
Figure 3:
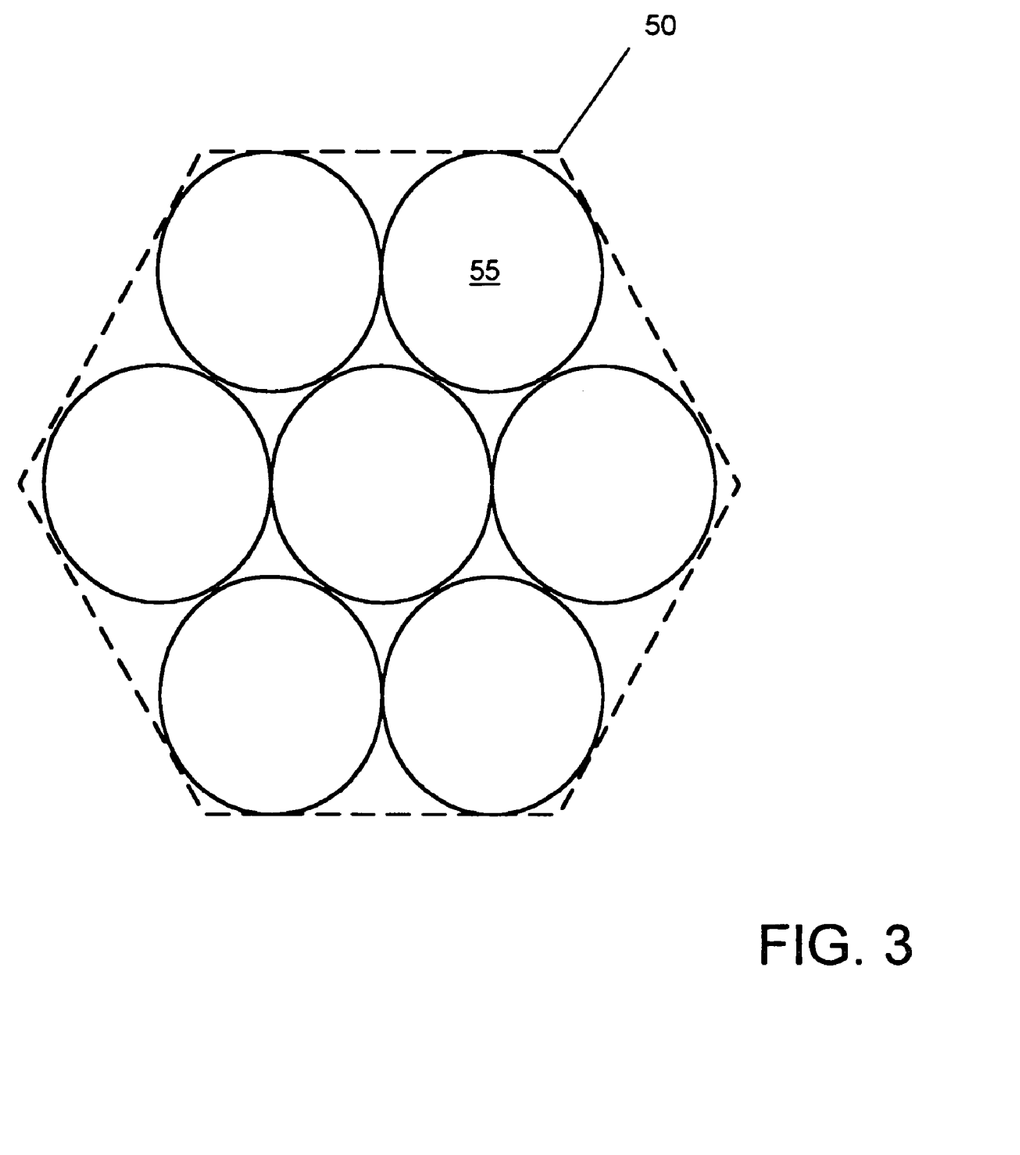
FIG. 3 is a plan view of the schematically shown, hexagonal cluster segment of the primary mirror.

There is shown in FIG. 2, a plan view the unique compound design of the stationary primary mirror 15. This unique design is comprised of 19 hexagonal groupings, where each hexagonal group 50 consists of 7 movable mirrors 55, giving a total of 133 reflective surfaces. Twelve supplementary mirrors 60 are added optionally to expand and complement the array, thereby increasing the total number of movable segments to 145. FIG. 3 details a single hexagonal group 50 of the array 15.

Figure 4:
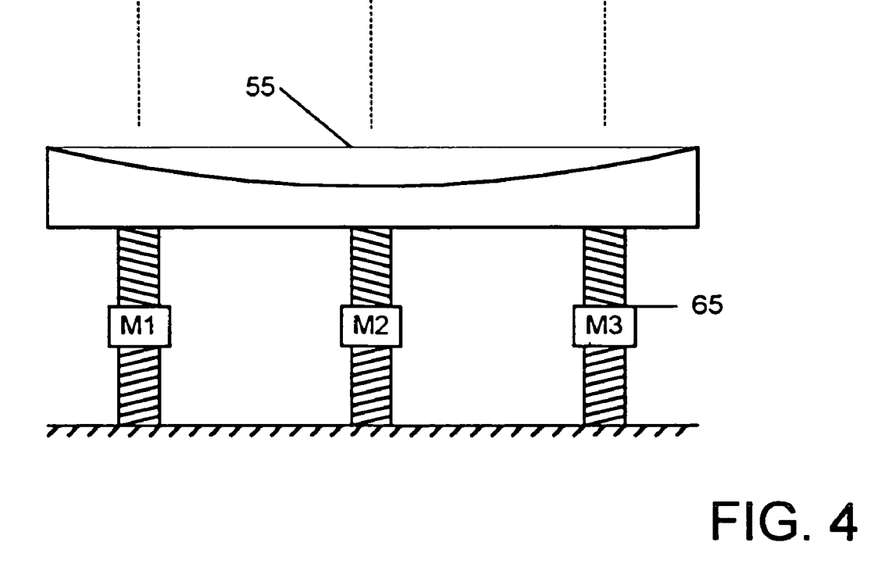
FIG. 4 is a side view of an individual mirror reflector illustrating the placement of the support means of FIGS. 2 and 3.
Figure 4A:
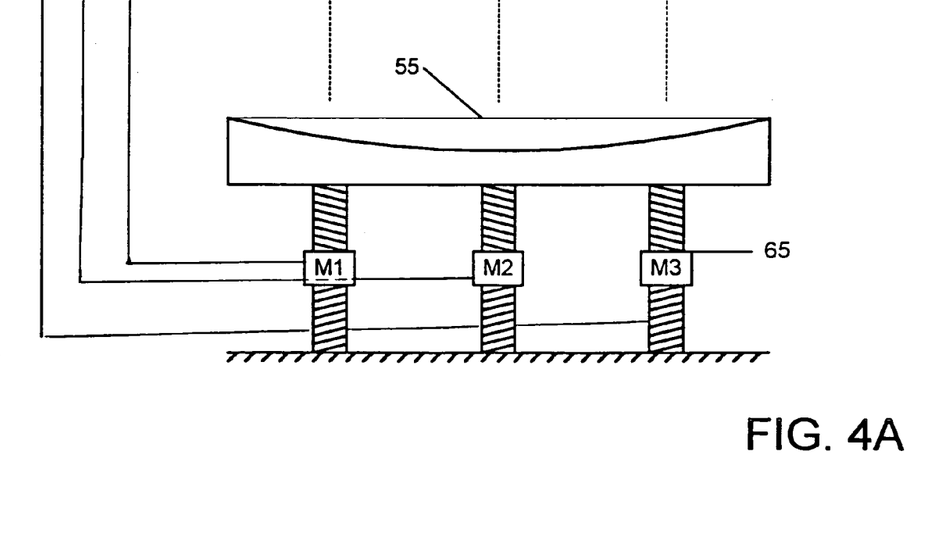
FIG. 4A is a side view of an individual mirror reflector illustrating the placement of three screw jacks for the support means of FIGS. 2 and 3, wherein the screw jacks communicate with sensors fixed on the mirror segment via a computer.
Figure 5:
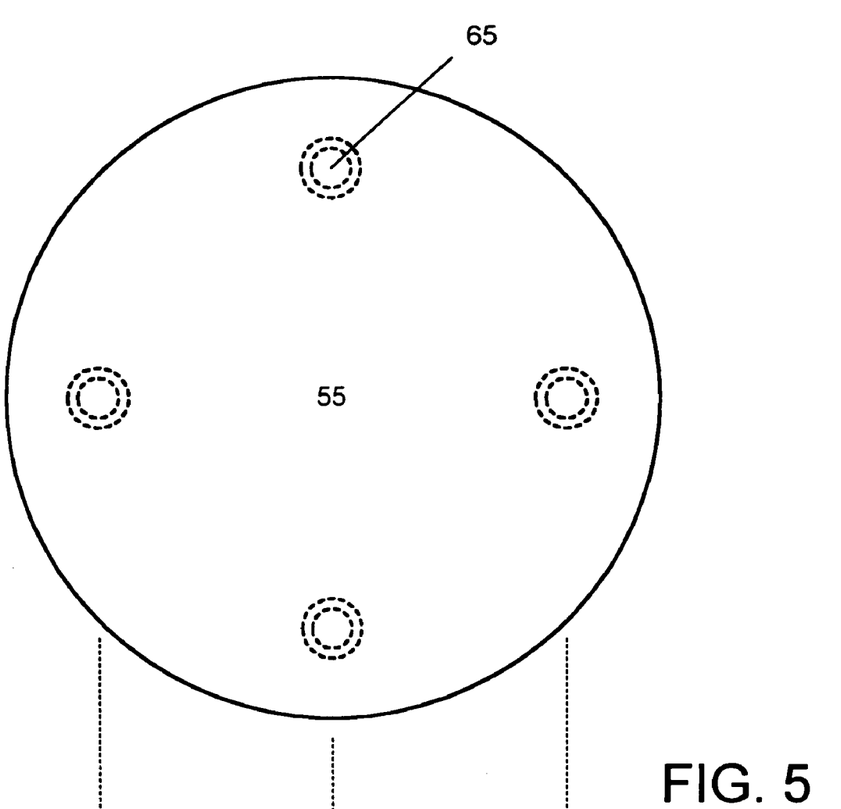
FIG. 5 is a plan view of an individual mirror reflector illustrating the placement of the support means shown in FIG. 4
Figure 5A:
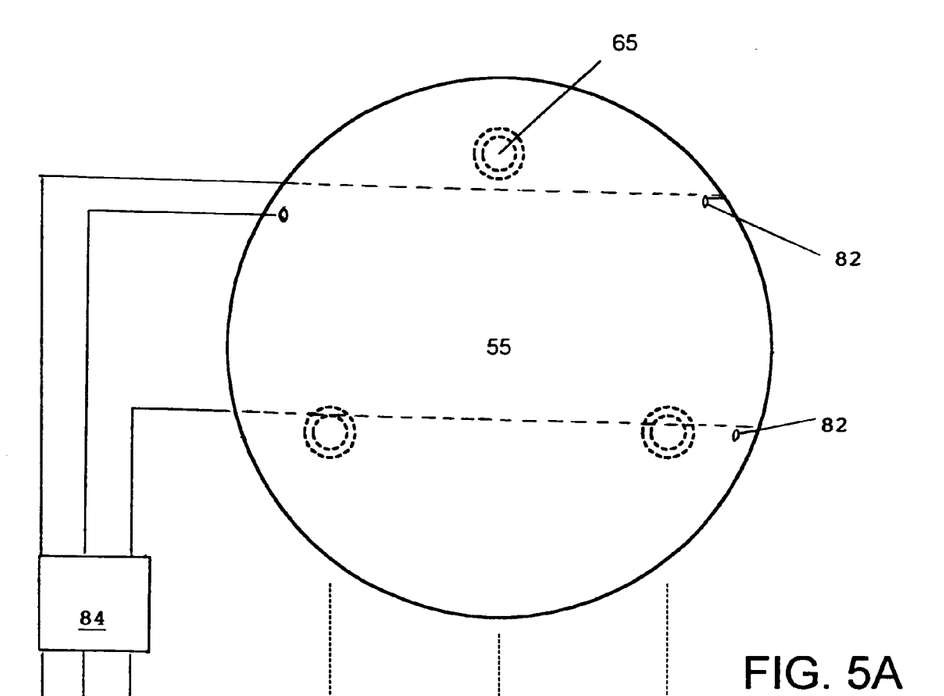
FIG. 5A is a plan view of an individual mirror reflector illustrating the placement of three screw jacks for the support means shown in FIG. 4A showing the re-alignment sensors fixed on the mirror segment.

FIGS. 4 and 5 show the mirrors 55 or 60 supported preferably by four individually adjustable, motorized screw jacks 65, although a three-point support, shown in FIGS. 4A and 5A can be used alternatively. The screw jacks can be wired directly or with wireless actuators.

And, as further shown in FIGS. 4A and 5A, the alignment system consists of eighty-four electronic sensors 82 mounted on the edges of each mirror 55, and 580 individual, motor-driven adjusting mechanisms that are called "position actuators." These actuators or screw jacks 65 are connected to the back of each mirror, where four or preferably three actuators 65 are used per mirror. The actuators 65 are electrically energized either by direct wiring or by means of wireless actuation.

Because of that large number of screw jacks used and the need for frequent adjustment to maintain stable operation, a computerized system may be used to perform automatic adjustment. In FIGS. 4A and 5A, each mirror segment 55 includes one or more sensors 82 configured for sensing the alignment of each segment in relation to its adjacent segments. Thus, each mirror segment further includes an associated means for adjusting in communication with computer 84 connected to the sensors 82 of each mirror segment 55 for an instantaneous alignment and continuous re-alignment of each segment in relation to its adjacent segments.

It is known that polishing a segment of a parabolic curve is practically impossible, the mirror segment would give a consequent wave-like, (or uneven), shape. However, polishing a segment of a sphere is quite routine. Hence, each mirror surface is polished to a spherical profile, then to a parabola. An outside perimeter of each mirror is round. And, while there are spaces between the mirror segments, no dark spots will appear on the reflecting mirror.

Figure 6:
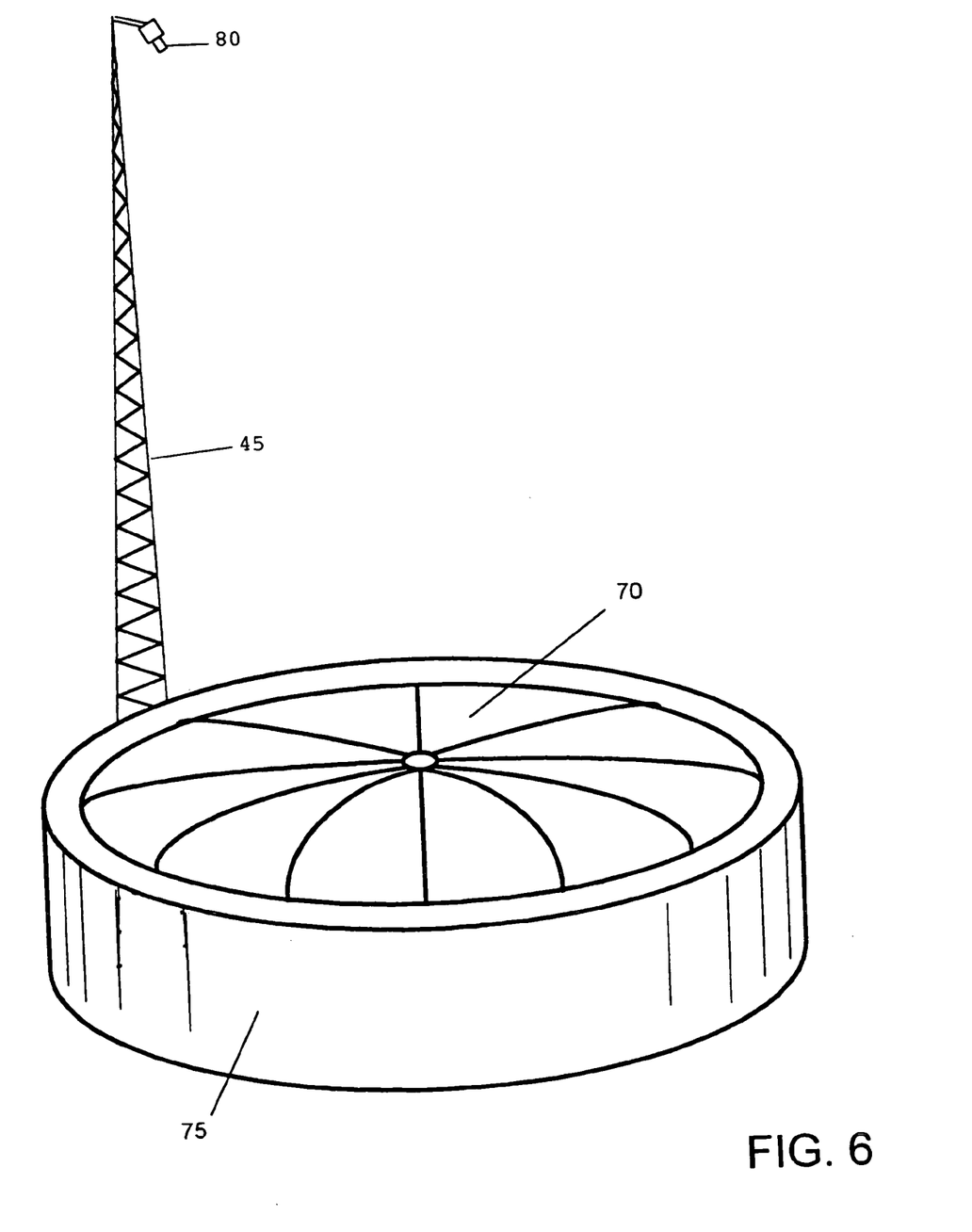
FIG. 6 is a perspective view of the air supported retractable hypalon roof shown in the closed position.

Because of the immense size of the mirror, a dome covering it would be excessively costly because of the immense weight of a conventional dome. In the preferred embodiment, FIG. 6 shows perspectively a view of the air supported retractable hypalon, flexible roof 70 shown in the closed position. A wall 75 of about 30 feet in height would be sufficient for isolating and housing the telescope of the present invention.

Figure 7:
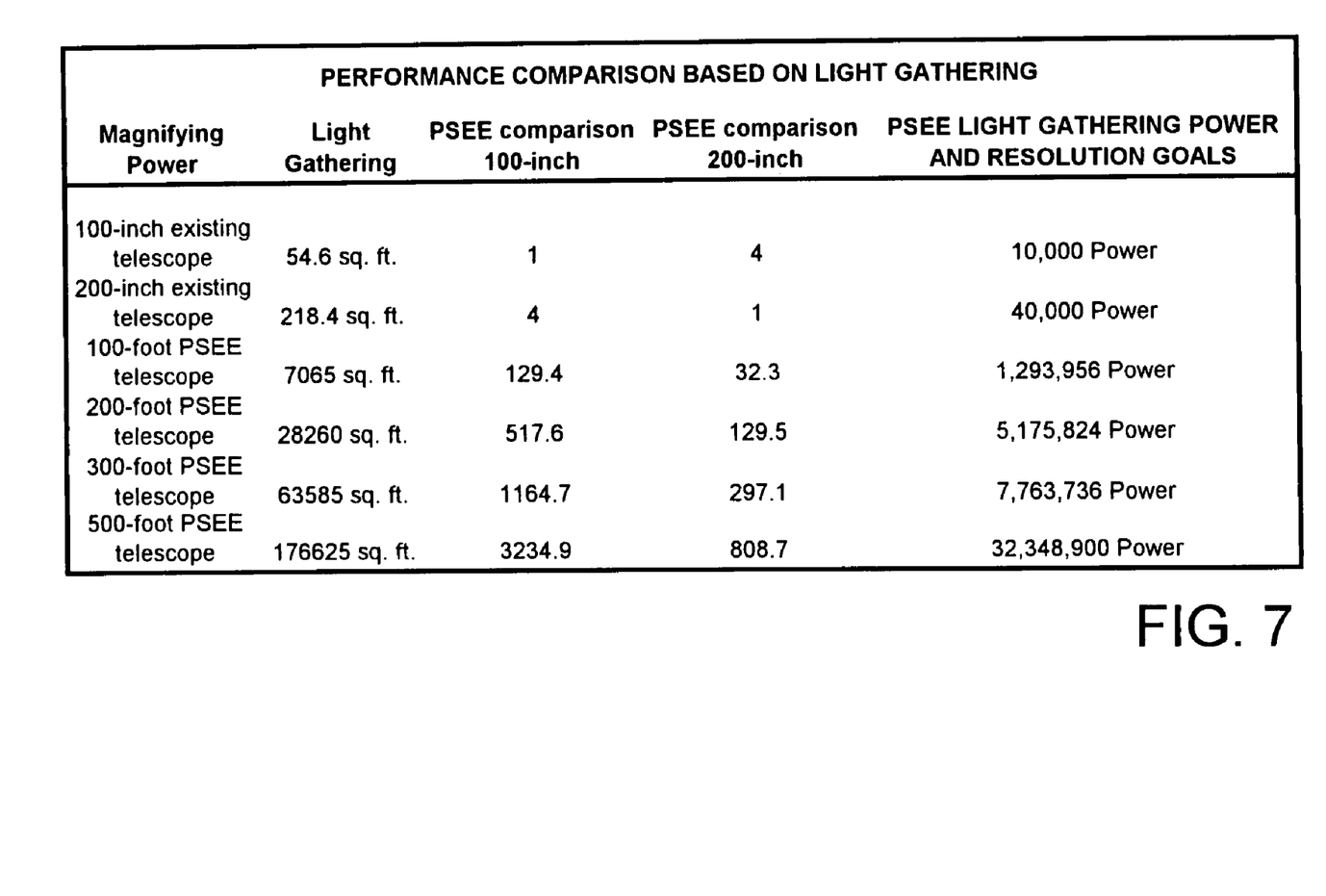
FIG. 7 is a table giving the Performance Comparison of the PSEE vs. existing telescopes, giving the light gathering, resolving power and resolution.

FIG. 7 gives the Performance Comparison Data of the PSEE telescope based on light gathering vs. existing telescopes; the light gathering, the magnification and resolving power is thus tabulated.

There can be no doubt that this novel telescope will make possible many improvements in astronomic data.

It should be appreciated and understood that the preceding detailed description is for example only. There may be other modifications, deviations, and improvements made, however, without departing from the true spirit of the present invention.

I claim:

1. An in-ground reflecting telescope comprising:
    an in-ground, stationary collecting mirror;
    said in-ground, stationary collecting mirror including a plurality of movable mirrored collectors selectively positioned in a parabolic array;
    a secondary mirror positioned at a focal point of the collecting mirror parabolic array;
    wherein the secondary mirror is mounted on a tower positioned near the primary mirror,
    an at least one observer eyepiece on a perimeter of the collecting mirror and trained at the secondary mirror, wherein a parabolized magnification is achieved without any large movable primary mirror structure;
    means for synchronizing a position of the observer eyepiece with a rotation of the earth;
    further comprising a means for traversing the collecting mirror perimeter;
    wherein the at least one observer eyepiece is advanced on the perimeter of the collecting mirror; and
    wherein the at least one observer eyepiece includes a camera for obtaining data on objects in deep space which are not discernable by the human eye.

2. The in-ground reflecting telescope in accordance with claim 1, wherein the camera comprises a digital camera with internet access that promulgates the images obtained on the internet in real time.

3. The in-ground reflecting telescope in accordance with claim 2, wherein the camera comprises a videocamera promulgates the images obtained by televideo transmission-inrealtime.

4. The in-ground reflecting telescope in accordance with claim 1, wherein an angle-of-tilt of the primary mirror is conformed to a latitude of the telescope site.

5. The in-ground reflecting telescope in accordance with claim 4, wherein the movable collectors of the parabolic array obviate the need for movement of the primary mirror.

6. The in-ground reflecting telescope in accordance with claim 5, further comprising a means for automatically adjusting each of the movable collectors to maintain an alignment of said collectors.

7. A segmented telescope comprising:
a primary mirror including a plurality of independently movable mirror segments, the primary mirror formed to have a parabolic shape with a focal point; each mirror segment having an at least one sensor configured for sensing an alignment of each segment in relation to its adjacent segments; each mirror segment further having an associated means for adjusting that communicates with a computer that is connected to the at least one sensor of each mirror segment for an instantaneous alignment of each segment in relation to its adjacent segments; wherein a surface of each mirror segment is formed to have a spherical profile, then parabolized; wherein the secondary mirror is mounted on a tower positioned near the primary mirror; wherein each of the mirror segments is supported on a plurality of screw jacks; and a video camera positioned at the focal point and configured to receive and re-transmit data received from the primary mirror.

8. The segmented telescope in accordance with claim 7, further comprising an alignment system including a plurality of electronic sensors mounted on each of the hexagonal segments.

9. The segmented telescope in accordance with claim 8, wherein the plurality of electronic sensors are in communication with the screwjacks of the mirrored collectors and with a computer for an automatic adjustment of each mirror.

10. The segmented telescope in accordance with claim 9, wherein the primary mirror is tilted at an angle which conforms to a telescope site latitude.

11. The segmented telescope in accordance with claim 10, further comprising a flexible plastic cover for protecting the telescope from adverse elements and the like.

12. The segmented telescope in accordance with claim 11, whereinthe cover comprises an air supported, retractable roof.

13. The segmented telescope in accordance with claim 12, wherein the cover is fabricated of a hypalon material.

14. The segmented telescope in accordance with claim 13, wherein the hypalon cover is supported by a wall that surrounds the primary collecting mirror.

15. A telescope comprising:
a stationary primary mirror comprising a plurality of movable collectors, each mounted on an at least one motor driven adjusting mechanism;
wherein the plurality of movable collectors is shaped as a parabola;
a secondary mirror suspended at a focal point of the primary mirror;
an observer eyepiece trained at the secondary mirror,
means for synchronizing a position of the observer eyepiece with a rotation of the earth; and
means for automatically adjusting each of the movable collectors to maintain an alignment of said collectors.

16. A reflecting telescope comprising:
an in-ground, stationary, land based, segmented primary collecting mirror;
said segmented primary collecting mirror including a plurality ofmovable mirrored collectors selectively positioned in a parabolic array;
a secondary mirror positioned at a focal point of the collecting mirror parabolic array; and,
an at least one observer eyepiece on a perimeter of the collecting mirror, trained at the secondary mirror, and including a means for traversing the collecting mirror perimeter;
wherein the at least one observer eyepiece is advanced on the perimeter of the collecting mirror and a parabolized magnification is achieved without any large movable primary mirror structure.

* * * * *